2,897,955
TROUGHED BELT CONVEYOR

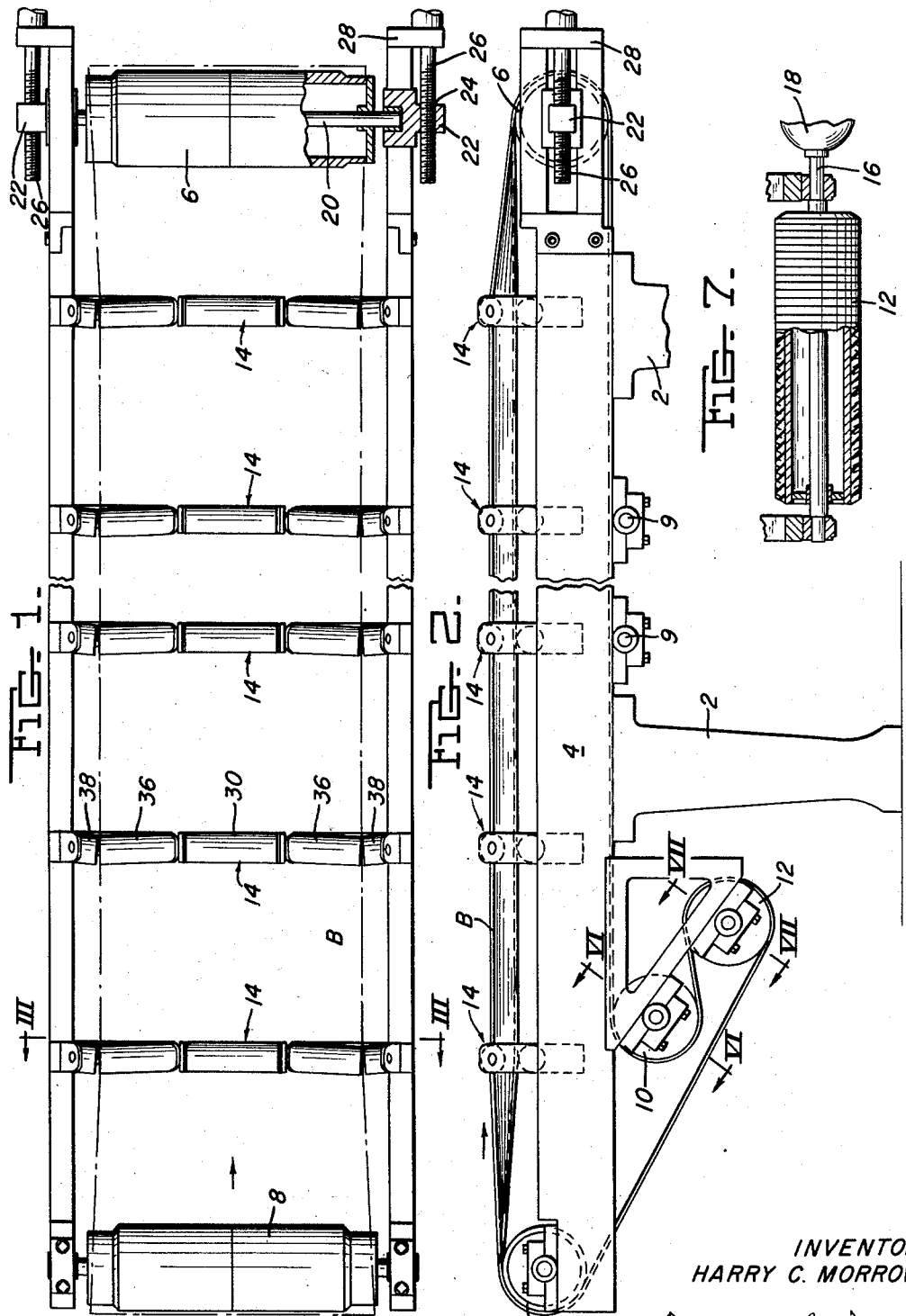

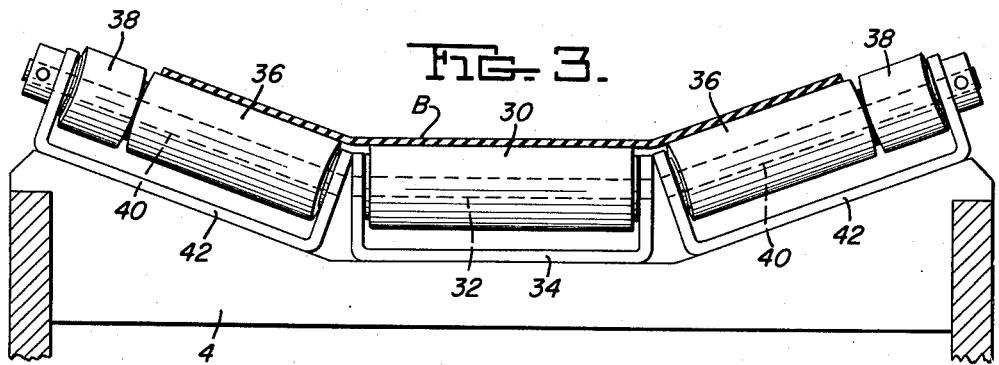
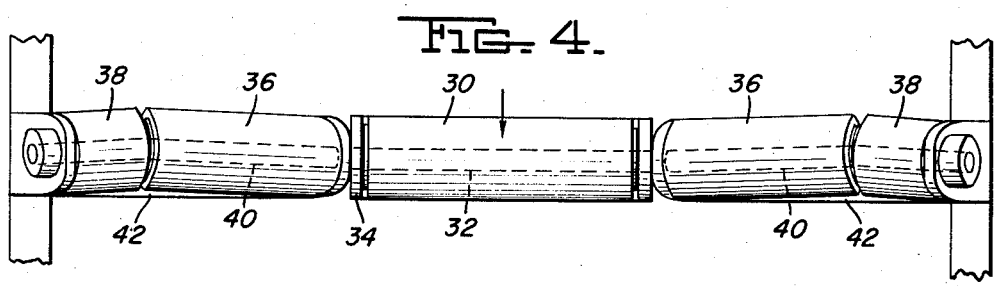
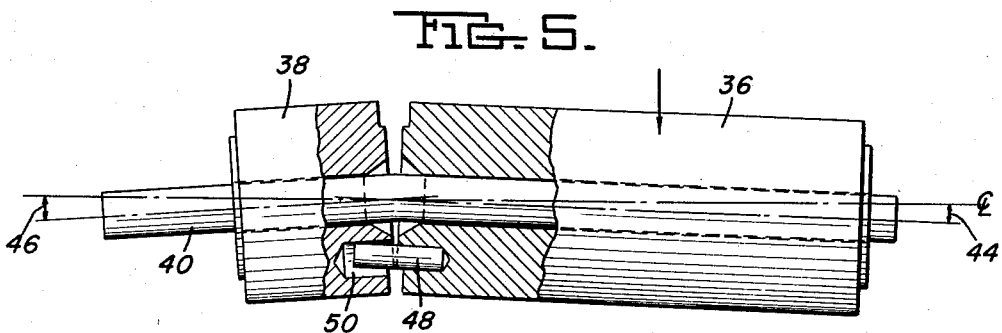
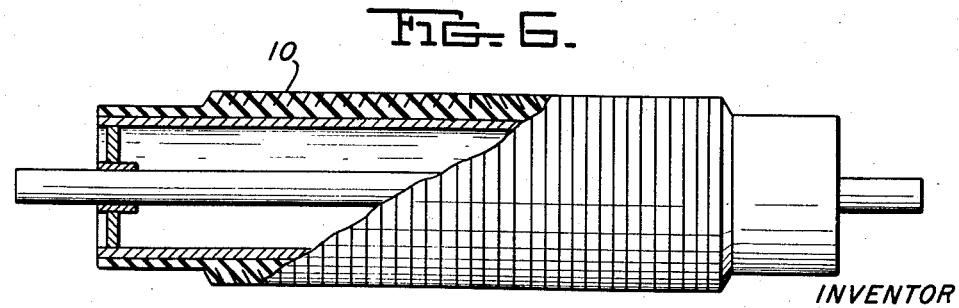
INVENTOR
HARRY C. MORROW
By: Donald G. Dalton
his Attorney United States Patent Office 2,897,955
Patented Aug. 4, 1959

Harry C. Morrow, Pittsburgh, Pa., assignor to United States Steel Corporation, a corporation of New Jersey Application May 13, 1957, Serial No. 658,725

4 Claims. (Cl. 198—202)

This invention relates to a troughed belt conveyor and more particularly to such a conveyor where the loads applied are unequal across the width thereof. Normally troughed belt conveyors use straight cylindrical rolls with their axes of rotation in a common vertical plane. Other troughed conveyors utilize rolls which are so designed that there are two tilted rolls, one on each side of a center roll arranged parallel to the end rolls. The two outer rolls are so arranged that their outer ends can swing a certain amount ahead of the axis of the center roll in the direction of belt travel. This system is successful with unloaded belts, or with belts which are uniformly loaded. However, when the belt is unequally loaded across its width the belt will tend to travel laterally to the side opposite the greater load. Other belt conveyors have been developed which center belts having unequally distributed loads such as shown in Lorig application, Serial No. 467,308, filed November 8, 1954. However, the cost of construction of this conveyor is relatively high.

It is therefore an object of my invention to provide a troughed belt conveyor in which lateral movement of the belt is limited regardless of the distribution of the load on the belt.

Another object is to provide such a conveyor which is relatively inexpensive to construct.

These and other objects will be more apparent after referring to the following specification and attached drawings, in which:

Figure 1 is a top plan view of the conveyor of my invention;

Figure 2 is a side elevation of the conveyor of Figure 1;

Figure 3 is a view taken on the line III—III of Figure 1;

Figure 4 is a plan view of Figure 3;

Figure 5 is an enlarged fragmentary view, partly in section, of a portion of Figure 4;

Figure 6 is a view, partly in section, taken on the line VI—VI of Figure 2 and showing one of the rolls used in the belt conveyor; and Figure 7 is a view taken on the line VII—VII of Figure 2.

Referring more particularly to the drawings, reference numeral 2 indicates the pedestals for supporting framework 4 of the belt conveyor of my invention. Endless belt B passes around end rolls 6 and 8, over return idler rolls 9, and around a drive bridle consisting of a narrow-bodied self-centering roll 10 and a cylindrical self-centering roll 12. A plurality of roll assemblies 14 are provided between rolls 6 and 8 for supporting the upper run of the belt. The rolls 6 and 8 are shown as narrow-bodied self-centering rolls of the type shown in Lorig Patent No. 2,593,158, dated April 15, 1952, but may be of the type shown in Lorig Patent No. 2,592,581, dated April 15, 1952. These rolls are preferably narrow-bodied, that is, they have a cylindrical strip supporting surface of less width than the width of the belt. Regardless of the type of self-centering roll used it will have two strip supporting sections, one on each side of the transverse center line of the roll, which are so constructed that they provide forces on each side of the transverse center directed inwardly toward the transverse center. Roll 10 is preferably a narrow-bodied roll of the type shown in the above mentioned Lorig Patent No. 2,592,581 and roll 12 is preferably a full bodied cylindrical roll of the same type. The roll 12 is provided with a shaft extension 16 so that it can be driven from a motor 18. The roll 6 is provided with a shaft 20 having each of its ends supported in a movable bracket 22. Each of the brackets 22 is provided with a threaded opening 24 for receiving a threaded shaft 26 which is mounted in a stationary bracket 28. Each of the roll assemblies 14 consists of a center substantially cylindrical roll 30 arranged with its axis substantially parallel to the axes of the rolls 6 and 8. The roll 30 is preferably mounted for rotation on a shaft 32 the ends of which are supported in a bracket 34. If desired, roll 30 may be a self-centering roll of the type disclosed in the above mentioned Lorig patents. However, for most purposes a plain cylindrical roll will be used. A substantially cylindrical roll 36 is provided on each side of the central roll 30 and a substantially cylindrical roll 38 is provided at the outer end of each roll 36. The associated rolls 36 and 38 are mounted for rotation on a bent shaft 40. Each of the shafts 40 is supported in a bracket 42 which is carried by the framework 4. The axis of rotation of roll 36 extends upwardly from the central roll 30 toward the direction of approach of the belt B and the axis of rotation of the roll 38 extends upwardly from the roll 36 away from the direction of approach of the belt. The axis of rotation of the roll 36 makes an angle 44 with the vertical plane through the axis of roll 30. The axis of rotation of the roll 38 makes an angle 46 with the vertical plane through the axis of roll 30. In one particular arrangement angle 44 is equal to 2° and angle 46 equal to 4°. The length of the roll 38 is preferably substantially less than the length of roll 36 and as shown is about one-third its length. The ends of the shafts 40 are preferably substantially in the vertical plane through the axis of roll 30. A pin 48 is preferably received in the roll 36 and extends into an opening 50 in the roll 38 so that the rolls 36 and 38 rotate in unison. The width of the belt B is preferably less than the distance between the rolls 38 so that the belt will normally be supported on rolls 30 and 36.

The operation of the conveyor is as follows:

The shaft 20 is arranged parallel to the axis of the roll 8 by means of adjusting screws 26 and sufficient tension is also applied to the belt B in this manner. The belt is then rotated in the direction of the arrow by means of the motor 18. If, because of uneven loading or other reasons, the belt travels laterally the rotating planes in the rolls 38 will counteract this lateral movement and cause the belt to move back toward center. It will be seen that the belt B is flat where it contacts the rolls 6 and 8 and also on the lower run of the belt, the roll changing from a troughed condition to a flat condition between the end roll assemblies 14 and the rolls 6 and 8. All of the roll assemblies 14 are shown as centering assemblies, but it will be understood that some conventional roll assemblies may also be used, it only being necessary that sufficient centering roll assemblies be provided to keep the belt centered on the rolls.

While one embodiment of my invention has been shown and described it will be apparent that other adaptations and modifications may be made without departing from the scope of the following claims.

I claim:

1. A troughed belt conveyor comprising a pair of end rolls for supporting said belt and a plurality of roll assemblies for supporting the troughed belt, at least part of said roll assemblies including a center roll having its axis substantially parallel to the axis of the end rolls, a roll on each side of said center roll having its axis extending upwardly from said center roll toward the direction of approach of said belt, and a roll at the outer end of each of said last named rolls having its axis extending upwardly therefrom away from the direction of approach of said belt.

2. A troughed belt conveyor comprising a pair of end rolls for supporting said belt, each of said end rolls being self-centering rolls, and a plurality of roll assemblies for supporting the troughed belt, at least part of said roll assemblies including a center roll having its axis substantially parallel to the axis of the end rolls, a roll on each side of said center roll having its axis extending upwardly from said center roll toward the direction of approach of said belt, and a roll at the outer end of each of said last named rolls having its axis extending upwardly therefrom away from the direction of approach of said belt.

3. A troughed belt conveyor comprising a pair of end rolls for supporting said belt, each of said end rolls being self-centering rolls, and a plurality of roll assemblies for supporting the troughed belt, at least part of said roll assemblies including a center roll having its axis substantially parallel to the axis of the end rolls, a roll on each side of said center roll having its axis extending upwardly from said center roll toward the direction of approach of said belt, and a roll at the outer end of each of said last named rolls having its axis extending upwardly therefrom away from the direction of approach of said belt, the length of each of said last named rolls being substantially less than the length of each of said second last named rolls.

4. A troughed belt conveyor comprising a pair of end rolls for supporting said belt, each of said end rolls being narrow-bodied self-centering rolls having a cylindrical belt supporting surface of less width than the width of the belt, and a plurality of roll assemblies for supporting the troughed belt, at least part of said roll assemblies including a center substantially cylindrical roll having its axis substantially parallel to the axis of the end rolls, a substantially cylindrical roll on each side of said center roll having its axis extending upwardly from said center roll toward the direction of approach of said belt, and a substantially cylindrical roll at the outer end of each of said last named rolls having its axis extending upwardly therefrom away from the direction of approach of said belt, the length of each of said last named rolls being substantially less than the length of each of said second last named rolls, the width of said belt being less than the distance between the outer rolls.

References Cited in the file of this patent

UNITED STATES PATENTS

| | | |
|---|---|---|
| 1,446,264 | Mitchell | Feb. 20, 1923 |
| 1,446,270 | Pfeiffer | Feb. 20, 1923 |
| 1,633,153 | Wray | June 21, 1927 |
| 2,593,158 | Lorig | Apr. 15, 1952 |

FOREIGN PATENTS

| | | |
|---|---|---|
| 290,930 | Italy | Dec. 3, 1931 |
| 1,101,764 | France | Apr. 27, 1955 |